United States Patent [19]

Tanaka et al.

[11] Patent Number: 5,044,551
[45] Date of Patent: Sep. 3, 1991

[54] THERMO BULB FOR USE WITH THE THERMOSTATIC EXPANSION VALVE

[75] Inventors: Hazime Tanaka, Yokohama; Kazuhiko Watanabe, Kanagawa, both of Japan

[73] Assignee: Fuji Koki Mfg. Co. Ltd., Tokyo, Japan

[21] Appl. No.: 462,299

[22] Filed: Dec. 29, 1989

Related U.S. Application Data

[63] Continuation-in-part of Ser. No. 292,356, Dec. 30, 1988, abandoned.

[30] Foreign Application Priority Data

Jan. 8, 1988 [JP] Japan .................................. 63-2130

[51] Int. Cl.⁵ ........................................... G05D 23/12
[52] U.S. Cl. .................... 236/92 B; 62/225; 236/99 R
[58] Field of Search ............ 62/225; 236/92 B, 99 R; 374/202; 126/400

[56] References Cited

U.S. PATENT DOCUMENTS

| 3,141,454 | 7/1964 | Laing | 126/400 X |
| 3,726,141 | 4/1973 | Bremer | 374/202 |
| 3,885,126 | 5/1975 | Sugiyama et al. | 126/400 X |
| 4,036,058 | 7/1977 | Bodker | 374/202 |
| 4,258,695 | 3/1981 | McCarton et al. | 126/400 X |
| 4,714,821 | 12/1987 | Jakobsson | 126/400 X |

Primary Examiner—William E. Tapolcai
Attorney, Agent, or Firm—Joseph Scafetta, Jr.

[57] ABSTRACT

A thermo bulb for use with a thermostatic expansion valve, includes a temperature sensing cylinder connected to a power element of a valve unit of the thermostatic expansion valve, a thermal ballast arranged in the temperature sensing cylinder and made by a ceramic sinter which has silica and alumina as its main components, an operating fluid sealed in the temperature sensing cylinder to change from gas to liquid and vice versa in response to temperature sensed by the cylinder at an outlet of an evaporator of a refrigeration system, and an arrangement for fixing the thermal ballast into a certain position in the temperature sensing cylinder so as not to prevent the thermal ballast from making contact with an inner surface of the temperature sensing cylinder.

10 Claims, 4 Drawing Sheets

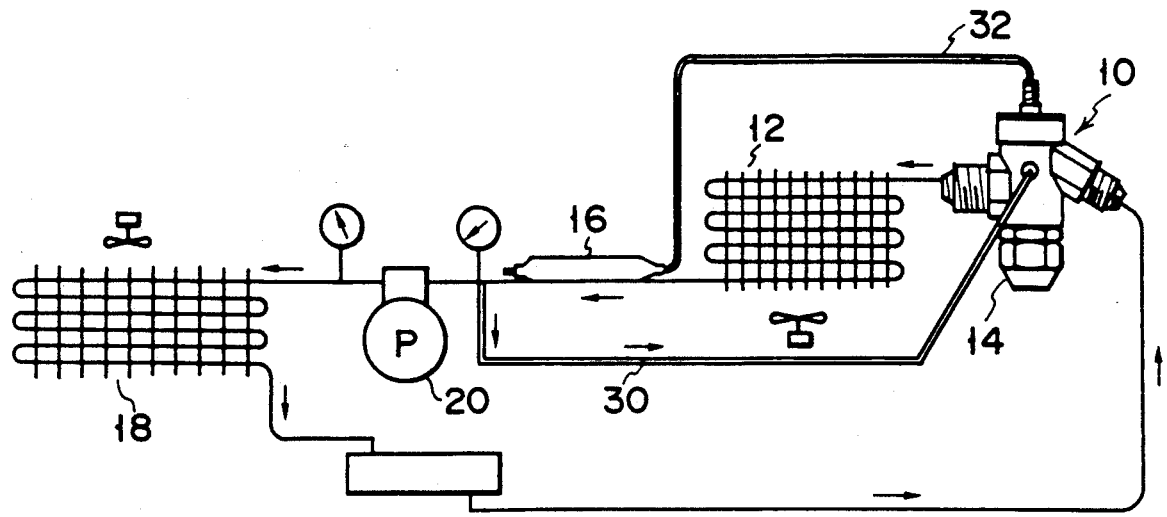
F I G. 1

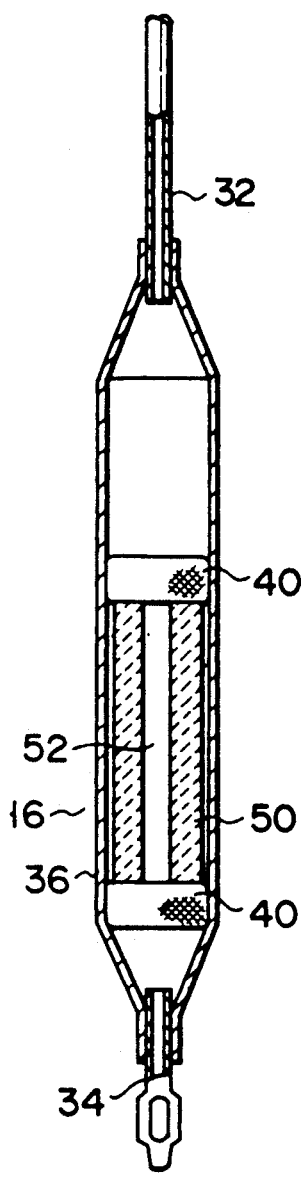
F I G. 4
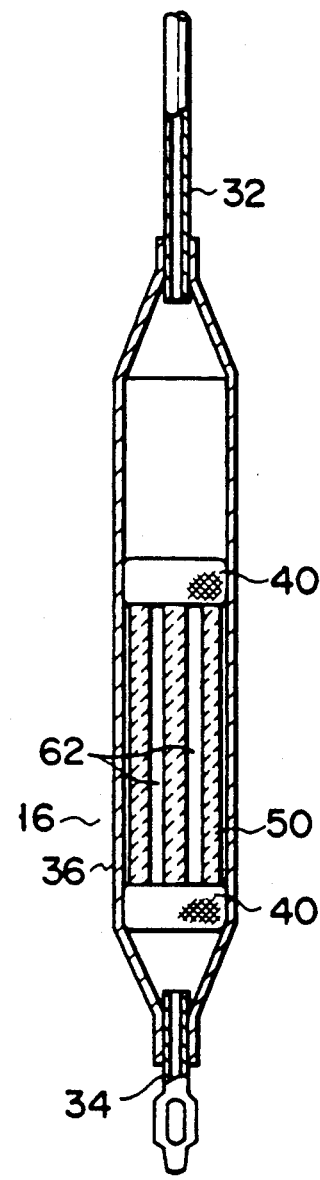
F I G. 7
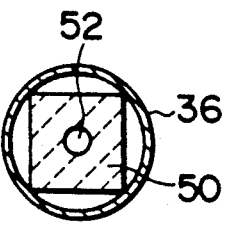
F I G. 8
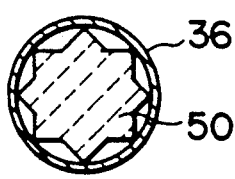
F I G. 9
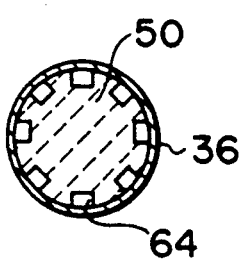
F I G. 10

THERMO BULB FOR USE WITH THE THERMOSTATIC EXPANSION VALVE

This is a continuation-in-part of application Ser. No. 07/292,356, filed Dec. 30, 1988, which was abandoned upon the filing hereof.

BACKGROUND OF THE INVENTION

1. Field of the Invention

The present invention relates to an improvement of a thermo bulb for use with a thermostatic expansion valve.

2. Description of the Related Art

FIG. 1 schematically shows an overall arrangement of a refrigeration system provided with a thermostatic expansion valve 10. Thermostatic expansion valve 10 has a valve unit 14 located at an inlet of an evaporator 12 and a thermo bulb 16 located at an outlet of the evaporator 12 to sense the temperature of superheated refrigerant vapor. Thermostatic expansion valve 10 controls the extent of its valve opening in response to the difference (superheat) between the temperature of the superheated refrigerant vapor sensed at the outlet of the evaporator 12 by the thermo bulb 16 and the evaporating temperature of a refrigerant in the evaporator 12. This action results in the pressure of the refrigerant supplied from a condenser 18 is being reduced to make it easy for the refrigerant to evaporate in the evaporator 12. This action results in the flow rate of the refrigerant flowing into the inlet of the evaporator 12 being under a negative feed-back controlled to make the superheat reach a certain value at which the ability of the evaporator 12 is maximum (or the refrigerating ability of the refrigeration system is maximum). The reduction of the superheat to zero or less means that all of the refrigerant is not changed from liquid to vapor in the evaporator 12 so that the liquid refrigerant flows into a compressor 20 and breaks or damages the compressor 20. Therefore, the certain value of the superheat is over zero, but however, if the certain value is too large the refrigeration reduces its refrigerating ability in comparison with its input.

In FIG. 2, a power element 22 controls the valve opening of the valve unit 14 to make the changing practical superheat equal to the certain value. Power element 22 has a diagram 26 connected to the valve body 24 through an actuating rod, and produces force opposing an urging force of an urging means 28 for urging valve body 24 to its closed position. As shown in FIG. 1, superheated vapor of the refrigerant is introduced from the outlet of evaporator 12 to one side of the diaphragm 26 through a pipe 30, while a base end of pipe 32 whose extended end is connected to thermo bulb 16 is located on the other side of the diaphragm 26.

Valve unit 14 having the above-constructed power element 22 is well known.

FIG. 3 is a vertically cross-sectioned view showing the conventional temperature sensor 16 for sensing the temperature of superheated refrigerant vapor. Thermo bulb 16 has a bulb cylinder 36 which is communicated with an extended end of the pipe 32 at one end thereof and which is sealed by sealing a plug 34 at the other end thereof. Bulb cylinder 36 is made of material such as copper having a high thermal conductivity. A rod-like thermal ballast 38 having a rectangular section is housed in the bulb cylinder 36 with its two the supported by metal net-like support members 40. Thermal ballast 38 is made of inorganic material such as asbestos or heat insulating board having a heat capacity higher than a certain value. An operating fluid having the substantially same vapor-liquid equilibrium temperature characteristic as the refrigerant in the refrigeration system is sealed in the bulb cylinder 36 together with a gas such as helium or nitrogen which is not condensed to liquid at a temperature under which the thermostatic expansion valve 10 is used. The gas such as helium or nitrogen applies a certain pre-pressure to that side of the diaphragm 26 on which the base end of the pipe 32 is located.

When an outer thermal-load reduces rapidly in the above constructed refrigeration system and the thermo bulb 16 senses a lowering of the temperature of superheated refrigerant vapor at the outlet of the evaporator 12 to make superheat become less than the above-mentioned certain value, a part of the operating liquid sealed in the bulb cylinder 36 of the thermo bulb 16 located at the outlet of the evaporator 12 changes from gas to liquid on the surface of the bulb cylinder 36 and the time constant of this change is comparatively small. As a result, pressure in the bulb cylinder 36 decreases comparatively quickly and the diaphragm 26 in FIG. 2 moves comparatively quickly upward to make the valve opening smaller. At this time, the flow rate of the refrigerant flowing into the inlet of the evaporator 12 is reduced comparatively quickly to prevent a liquid flood of the refrigerant to the compressor 20.

It is well known that when the liquid refrigerant reaches compressor 20 it will break or damage the latter.

When a thermal-load to the evaporator 12 increases rapidly, or the outer thermal-load increases rapidly, and after the thermo bulb 16 senses an increasing temperature of superheated refrigerant vapor at the outlet of the evaporator 12 so as to make superheat become more than a certain value, the liquid operating fluid which is trapped on porous surfaces of the thermal ballast 38 in the bulb cylinder 36 of the thermo bulb 16 located at the outlet of the evaporator 12 is gasified as the temperature of the thermal ballast 38 rises. The time constant of this change from liquid to gas is comparatively large because the thermal ballast 38 is made of material having low heat conductivity, as described above. As a result, the pressure in the bulb cylinder 36 rises comparatively slowly and the diaphragm 26 moves comparatively slowly downward in FIG. 2 to make the valve opening larger. At this time, the flow rate of the refrigerant flowing into the inlet of the evaporator 12 increases comparatively slowly.

It is well known that this comparatively slow increase the valve opening at the time when the superheat of the refrigerant rises effectively restrains a repeating of a quick increase and a reduction of the valve opening in a short cycle (the hunting phenomenon). The hunting phenomenon produces a repeating of an excess of and a shortage of the refrigerant supplied to the evaporator 12 in a short cycle and reduces the overall efficiency of the refrigeration system. The excess of the refrigerant supplied to the evaporator 12 in the hunting phenomenon causes the refrigerant to be supplied or flooded as liquid to the compressor 20. This causes the compressor 20 to be damaged.

Pressure of the superheated refrigerant vapor is applied from the outlet of the evaporator 12 to the one side of the diaphragm 26 in a power element 22 through the pipe 30. This pressure has a certain relationship with the evaporating temperature of the refrigerant which relationship is a factor for determining the superheat at the exists of the evaporator 12, so that superheat is the difference between the evaporating temperature obtained from the certain relationship and the temperature of the superheated refrigerant vapor at the exits of the evaporator 12.

Since the force of the urging means 28 can be adjusted by an adjusting means 42, a desired valve opening can be freely set to create a desired superheat of a certain value the evaporator 12.

The following problems are caused in the above-described prior art thermo bulb 16.

(1) Asbestos of which thermal ballast 38 is made is a well-known carcinogenic substance that causes lung cancer.

(2) The main raw material of the heat insulating board from which the thermal ballast 38 is made is a natural product including diatomaceous earth and the like. It is therefore impossible to precisely control the components of this raw material unchanged. In addition, this raw material includes a very small amount of various impurities. The characteristic of the thermal ballast 38 thus changes slightly with every batch of products manufactured.

(3). Material such as asbestos and heat insulating board has a gas adsorption characteristic that influences the performance of the thermo bulb 16. The gas adsorption characteristic changes depending upon the temperature and becomes larger as the temperature falls. Therefore, since a thermal-pressure equilibrium characteristic of the fluid sealed in the bulb cylinder 36 is determined in a case in which the thermal ballast 38 is omitted and is remarkably changed, a precise value of the maximum operating pressure of the thermo bulb 16 can not be determined.

(4) Thermal ballast 38 having no gas adsorption characteristic can be made by a metal sinter or foam. However, it is likely to change chemically. Therefore, it is also likely to be chemically altered by any heat produced, such as by brazing, while the thermo bulb 16 and the valve body 14 are being assembled in the manufacturing process the operating fluid sealed in the bulb cylinder 36 is likely to chemically react under catalysis of the thermal ballast 38. Therefore, the thermal ballast 38 made of a metal sinter or foam cannot be used practically unless a specific treatment for making it chemically stable is carried out first. It is often insufficient to employ only the common high temperature vacuum drying process for eliminating from the thermal ballast 38 those gases which have been absorbed in the thermal ballast 38 having a high gas adsorption characteristic in the manufacturing process before the operating liquid is sealed in the bulb cylinder 36.

The above-mentioned specific treatment increases greatly the cost of manufacturing the thermo bulb 16. In addition, the thermal ballast 38 in which gases (except from the operating liquid) are adsorbed makes the performance of the thermo bulb 16 insufficient.

SUMMARY OF THE INVENTION

The present invention is intended to eliminate the above-mentioned drawbacks and the object of the present invention is therefore to provide a thermo bulb for use with a thermostatic expansion valve, which makes it possible so that the health of those persons who work along the thermo bulb manufacturing line is not adversely affected so that the performance of the thermo bulb is kept unchanged with every lot produced so that the above-mentioned various drawbacks caused by the gas adsorption characteristic of the thermal ballast are eliminated; so that no specific treatment which increases the cost of manufacturing the thermo bulb is needed; so that those liquids which have been held on or attached to the thermal ballast are completely removed from the thermal ballast for a short time period to make the manufacturing process efficient; so that the thermo bulb is made simple in construction and manufactured with ease; and so that the hunting phenomenon, which is a cause of damaging the thermostatic expansion valve, and the returning of the liquid refrigerant to the compressor are prevented reliably.

The object of the present invention can be achieved by a thermo bulb for use with the thermostatic expansion valve, comprising a temperature sensing cylinder connected to a power element of a valve unit of the thermostatic expansion valve; a thermal ballast arranged in the temperature-sensing cylinder and made of a ceramic sinter which includes silica and alumina as its main components; and an operating fluid, sealed in the temperature sensing cylinder so as to change from liquid to gas and vice versa, said fluid being responsive to the temperatures sensed by the the cylinder at an outlet of an evaporator of a refrigeration system. In the thermo bulb, a gas, which is not condensed under the range of temperature sensed by the cylinder at the outlet of the evaporator of the refrigeration system, may be sealed in the temperature sensing cylinder to produce a pre-pressure.

The ceramic sinter whose main components are silica and alumina is not harmful to the human body. Manufacturing quality control is easy and its quality can be kept unchanged. The performance of the thermal ballast can be thus kept unchanged. The ceramic sinter has no gas adsorption ability and it is chemically stable, so that no specific process which makes the manufacturing cost for the thermo bulb high is needed accordingly. Liquid operating fluids which have been trapped in or on the thermal ballast can be completely removed from the thermal ballast by the common high temperature vacuum drying process, thereby making the manufacturing process efficient. The thermo bulb can be made simple in construction and can be manufactured with great ease. Furthermore when this thermal ballast is used, the hunting phenomenon which damages the refrigeration system and the returning of the liquid refrigerant to the compressor can be reliably prevented.

In the case of the thermo bulb having the above-described arrangement according to the present invention, it is preferable that pores in the thermal ballast occupy about 20% about 40% of the whole volume of the thermal ballast.

In the case where the ceramic sinter (of which the thermal ballast is made) is made of the same material and in the same shape, its strength becomes less as the percentage of its pores occupying its whole volume becomes higher. The thermal ballast made by the ceramic sinter, which has a low percentage of its pores and which has great strength, can hold only a little amount of the liquidized operating fluid. Therefore, a part of the operating fluid is quickly changed from liquid to gas, responsive to the rise of the temperature sensed by the thermo bulb at the outlet of the evaporator. This sensing causes the valve opening to be quickly changed in response to the rise of superheat. The hunting phenomenon and the flowing of the liquidized refrigerant into the compressor are thus caused in the prior art.

When pores occupy about 20% to 40% of the whole volume of the thermal ballast, the thermal ballast made of the ceramic sinter can have an appropriate strength and also can hold a sufficient amount of the liquid operating fluid on its surfaces and in its pores. Therefore, the transition from a liquid phase to a gas phase requires a relatively long time when the thermo bulb senses the temperature rising at the outlet of the evaporator. Thus, this arrangement serves to moderate the speed of the valve opening. Furthermore, the arrangement may serve to prevent the hunting phenomenon and the flowing of the liquidized refrigerant into the compressor from occuring.

In the case of the thermo bulb having the above-described arrangement according to the present invention, it is preferable that the weight percentage of alumina and silica in a ceramic sinter of which the thermal ballast is made is in a range of 1: about 0.17 to 1: about 0.2.

This weight percentage of composition makes the strength and the specific heat of the ceramic sinter most suitable for the thermal ballast.

In the case of the thermo bulb having the above-described arrangement according to the present invention, it is preferable that the thermal ballast is made cylindrical with a through hole therein so that the bulb cylinder has a gas injection hole at a position that substantially corresponds to the through hole of the thermal ballast.

When both the thermal ballast and the temperature sensing cylinder are arranged in this manner, the operating fluid and the pre-pressure gas can be easily injected into the bulb cylinder in the assembly process of the thermo bulb. In addition, the movement of the operating fluid, particularly the liquidized operating fluid in the bulb cylinder, can be made easy.

When the thermal ballast has at least two through-holes extending in the axial direction thereof or when the thermal ballast has a polygonal cross-section or when the thermal ballast has at least two grooves formed on its outer surface to extend in the axial direction thereof, the operating fluid and the pre-pressure gas can also be injected into the bulb cylinder easily and the operating fluid, particularly the liquidized operating fluid, can also be moved in the bulb cylinder easily, as described above.

In the case of the thermo bulb having the above-described arrangement according to the present invention, there is provided a means for fixing the thermal ballast at a certain position with substantially unequal axial clearances in the temperature sensing cylinder.

This thermal ballast fixing means prevents the thermal ballast from being moved in the temperature sensing cylinder. The thermal ballast cannot be damaged accordingly and the performance of the thermo bulb can be kept unchanged because the thermal ballast is not moved in the temperature sensing cylinder.

In the case of the thermo bulb having the above-described arrangement according to the present invention, the time constant of the pressure fall in the bulb cylinder which is obtained when the temperature of the cylinder falls from 0 degrees C. (273 degrees K.) to −10 degrees C. (about 263 degrees K.) is about 4.0 seconds in a first order lag approximation and the time constant of the pressure rise in the bulb cylinder which is obtained when the temperature of the cylinder rises from −10 degrees C. (about 263 degrees K.) to 0 degrees C. (273 degrees K.) is about 55±15 seconds in the first order lag approximation.

The thermal ballast is coaxially supported in the bulb cylinder by paired metal net-like support members with substantially unequal axial clearances at opposite ends thereof and an equal radial clearance is held between the outer circumferential surface of the thermal ballast and the inner circumferential surface of the bulb cylinder in the radial direction. This unequal clearance enables the gasified operating fluid in the large space at the upper end of the bulb cylinder to contact directly the larger area of the inner circumferential surface of the bulb cylinder, thus promoting heat transmission between the gasified operating fluid and the bulb cylinder. When the temperature falls, as described above, heat is quickly transmitted from the gasified operating fluid to the bulb cylinder to increase the speed at which the gasified operating fluid is liquidized. Thus, the valve opening is reduced quickly to prevent liquidized refrigerant from flowing forward into the compressor, as described above in detail referring to the conventional example.

The unequal clearance also serves to delay heat transmission between the thermal ballast and the bulb cylinder. The speed at which the liquidized operating fluid trapped in the pores in the lower end of the thermal ballast is gasified is reduced at the time of such temperature rise, as described above. Thus, the valve opening is increased slowly, so that the liquidized refrigerant can be prevented from flowing too quickly forward into the compressor and the hunting phenomenon can also be prevented.

BRIEF DESCRIPTION OF THE DRAWINGS

FIG. 1 schematically shows an overall arrangement of a refrigeration system provided with a thermostatic expansion valve;

FIG. 4 is a vertically cross-sectioned view schematically showing an example of the thermo bulb made according to a basic embodiment of the present invention;

FIG. 7 is a vertically cross-sectioned view schematically showing a first modification of the thermo bulb according to the present invention;

FIG. 8 is a horizontally cross-sectioned view schematically showing a second modification of the thermo bulb according to the present invention;

FIG. 9 is a horizontally cross-sectioned view schematically showing a third modification of the thermo bulb according to the present invention; and FIG. 10 is a horizontally cross-sectioned view schematically showing a fourth modification of the thermo bulb according to the present invention.

DETAILED DESCRIPTION OF THE PREFERRED EMBODIMENTS

Figure 2:
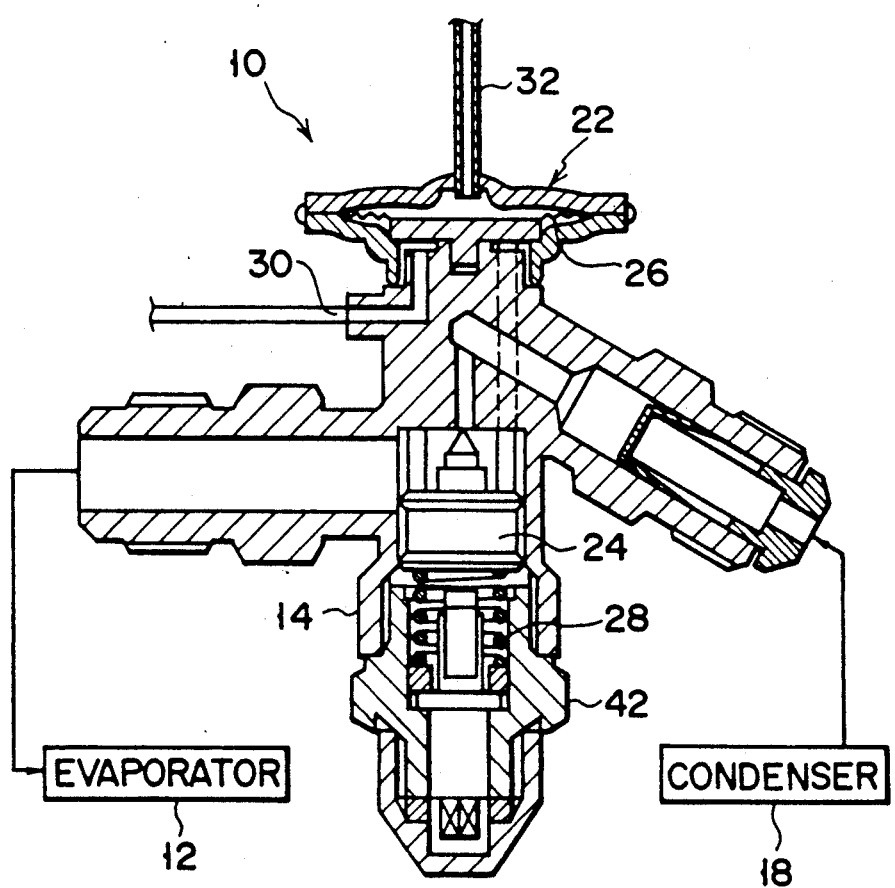
FIG. 2 is a vertically cross-sectioned view schemtatically showing a well-known valve unit in the thermostatic expansion valve.
Figure 3:
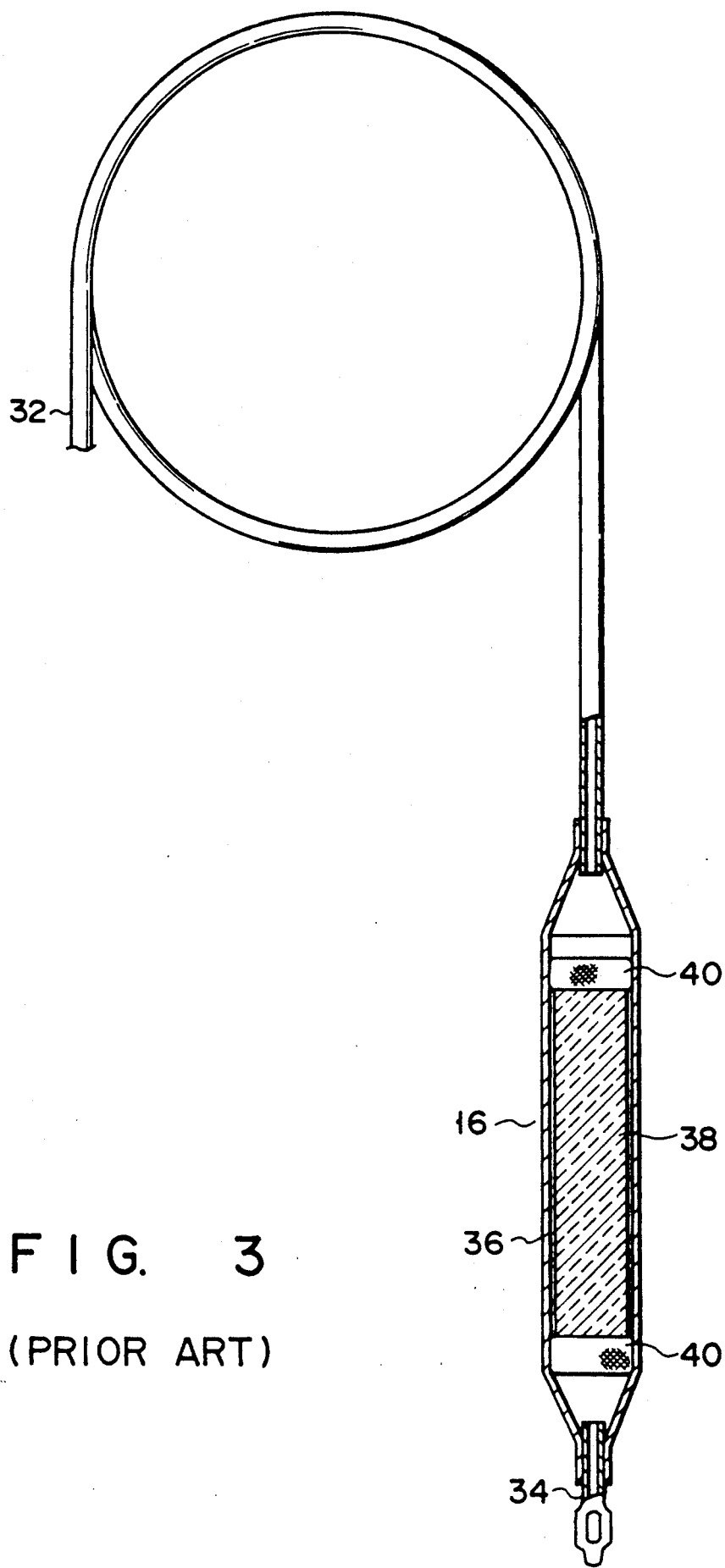
FIG. 3 is a vertically cross-sectioned view schematically showing the conventional thermo bulb of the thermostatic expansion valve.

An example of the thermo bulb according to the present invention and its modifications will be described referring to FIGS. 4 through 10. The parts which are the same as those of the conventional thermo bulb shown in FIG. 3 will be denoted by the same reference numerals and a detailed description of these parts will be omitted.

Thermo bulb 16 shown in FIG. 4 and made according to the present invention is used for the refrigeration system in which a refrigerant called R502 (molecular formula: $CHClF_2/C_2ClF_5$) is used. Bulb cylinder 36 is made of a copper pipe having an outer diameter of 12.7 mm. Thermal ballast 50 is a cylindrical ceramic sinter which is made by sintering at 1570 K. a material including silica and alumina as its main components. The outer diameter of the thermal ballast 50 is 10.8 mm and a center hole 52 through the thermal ballast 50 has a diameter of 3 mm.

Thermal ballast 50 is supported by metal net-like support members 40 at both ends thereof with substantially unequal axial clearances but with equal radial clearances in the inner space of the bulb cylinder 36 in such a way that the outer circumferencial surface of the thermal ballast 50 is not in contact with the inner circumferencial surface of the bulb cylinder 36.

Thermal ballast 50 is heated to 423 K. in a high temperature vacuum drying furnace before it is inserted into the inner space of the temperature sensing cylinder in the manufacturing process of the thermostatic expansion valve 10. Water and gases trapped in or on the thermal ballast 50 are thus completely removed from the thermal ballast 50. A certain amount of each one of an operating fluid and a pre-pressure gas is further injected into the inner space of the bulb cylinder 36 through a gas injection pipe 34 by the gas cross charging step in the manufacturing process for the thermostatic expansion valve 10. The gas injection pipe 34 is attached to an end of the bulb cylinder 36 opposite to that end thereof to which the pipe 32 extending from the power element 22 in the valve unit 14 is attached. Gas injection pipe 34 is sealed after this injection process to form a plug. The operating fluid employed in this example is a refrigerant called R22 (molecular formula: $CHClF_2$) and the pre-pressure gas is helium. Both the operating fluid and the pre-pressure gas injected into the inner space of the bulb cylinder 36 reach one side of the diaphragm 26 of the power element 22 through the pipe 32. The refrigerants R502 and R22 are standardized by ASHRAE STANDARD settled by the American Society of Heating, Refrigerating, and Air-Conditioning Engineers, Inc.

Operating fluid R22 has a saturated vapor pressure a little lower than that of refrigerant R502 in the refrigeration system as the same saturation temperature, and when it is mixed with helium gas, the pressure in the inner space of the bulb cylinder 36 is prevented from becoming zero superheat in a range of temperatures sensed by the bulb cylinder 36 while the refrigeration system is under operation.

Therefore, the thermostatic expansion valve 10 can be prevented from becoming inoperative and, thus, the efficiency of the refrigeration system can be prevented from becoming to low.

Figure 5:
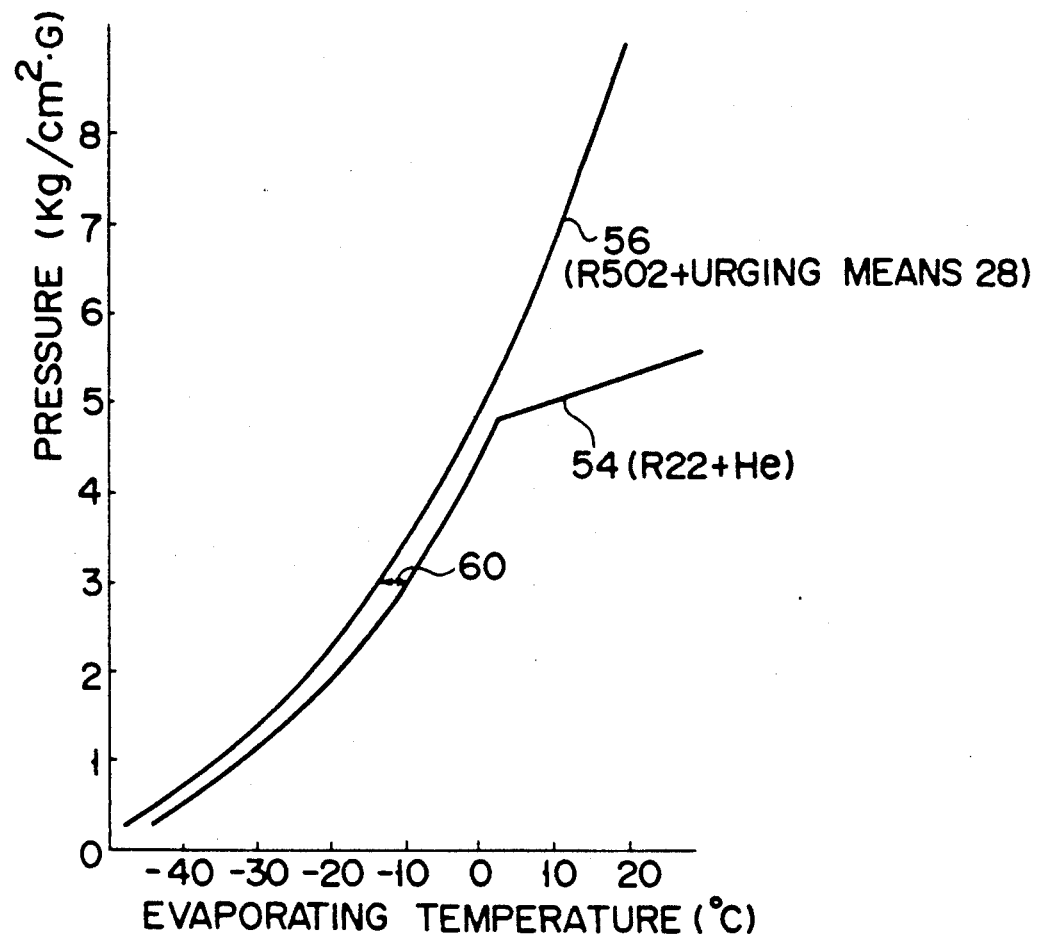
FIG. 5 is a graph showing how the sum of the pressure of the pre-pressure gas and that of the vapor of the operating fluid in the bulb cylinder, which is applied to one side of the diaphragm in the power element of the thermostatic expansion valve, changes in response to temperature, and how the sum of the force of the urging means in the power element of the thermostatic expansion valve and the pressure of the vapor of the refrigerant at the outlet of the evaporator, which is applied to the other side of the diaphragm, changes in response to the temperature.
Figure 6:
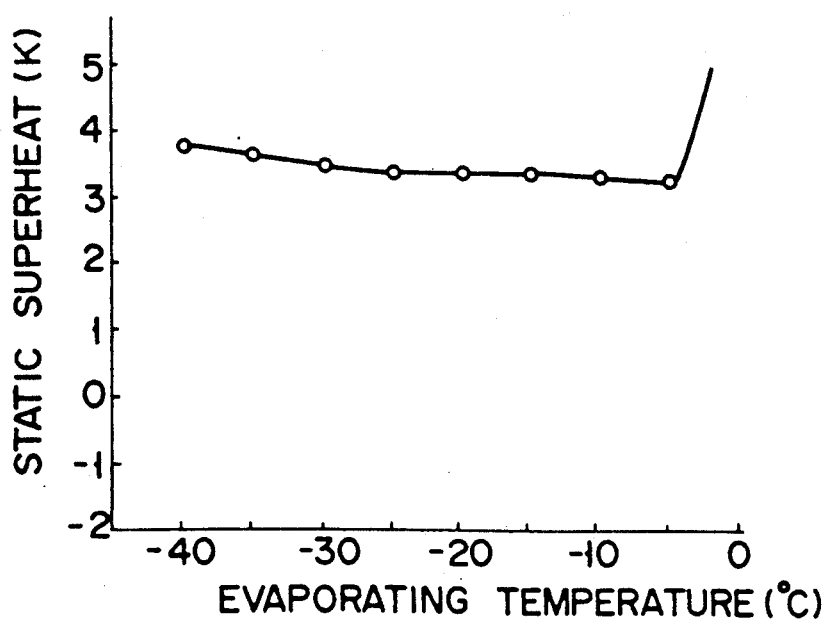
FIG. 6 is a graph showing values of static superheat at a range of evaporating temperature from −40° C. (about 233 K.) to −5° C. (about 268 K.), said values being represented by differences between a first solid line which shows the former pressure-temperature relationship in FIG. 5 and a second solid line which shows the latter pressure-temperature relationship in FIG. 5.

A first solid line 54 in the graph shown in FIG. 5 shows how the sum of the pressure of the vapor of the operating fluid R22 and the pressure of the pre-pressure gas changes in response to the temperature, while a second solid line 56 in the graph in FIG. 5 shows how the sum of the pressure of the vapor of the refrigerant R502 at the outlet of the evaporator 12 of the refrigeration system and the force of the urging means 28 changes in response to the temperature. The sum of the pressure shown by the first solid line 54 is applied to one side of the diaphragm 26 of the power element 22 in the thermostatic expansion valve 10 through the pipe 32 and the other sum of the pressure at the outlet of the evaporator 12 and the urging force is applied to the other side of the diaphragm 26 through the pipe 30. As it is apparent from this graph, the temperature difference (or static superheat) 60 between the first and the second solid lines 54 and 56 is substantially constant in a range between substantially 0° C. (about 273 K.) and −50° C. (about 223 K.). In this basic embodiment, the static superheat shows the amount of superheat necessary to overcome a part of the urging force of the urging means 28 so that any additional superheat will cause the valve to open. The change of the static superheat in the above-mentioned range of temperatures is shown in more detail in a graph in FIG. 6. It can be seen from this graph in FIG. 6 that the valve of the static superheat 60 is 3.5 K.+0.3 K. in the range of −40° C. (about 233 K.) to −5° C. (about 268 K.).

Thermal ballast 50 in the thermo bulb 16 according to the present invention has almost no gas adsorption characteristic in the above-mentioned temperature range. Therefore, the static superheat in the above-mentioned temperature range in FIG. 5 does not change even when the thermo bulb 16 is used for a long time.

In the case of the thermo bulb 16 having the above-described arrangement according to the present invention, the time constant of the pressure fall in the bulb cylinder 36 which is obtained when the temperature of the cylinder 36 falls from 0° C. (273 K.) to −10° C. (about 263 K.) is about 4.0 seconds in a first order lag approximation and the time constant of the pressure rise in the bulb cylinder 36 which is obtained when the temperature of the cylinder 36 rises from −10° C. (about 263 K.) to 0° C. (273 K.) is about 55±15 seconds in the first order lag approximation.

Returning now to the invention as shown in FIGS. 4 and 7, it may be seen that the thermal ballast 50 is coaxially supported in the bulb cylinder 36 by paired metal net-like support members 40 with substantially unequal axial clearances at opposite ends thereof and an equal radial clearance is held between the outer circumferential surface of the thermal ballast 50 and the inner circumferential surface of the bulb cylinder 36 in the radial direction. This unequal clearance enables the gasified operating fluid in the large space at the upper end of the bulb cylinder 36 to directly contact the larger area of the inner circumferential surface of the bulb cylinder 36, thus promoting heat transmission between the gasified operating fluid and the bulb cylinder 36. When the temperature falls as described above, therefore, heat is quickly transmitted from the gasified operating fluid to the bulb cylinder 36 to increase the speed at which the gasified operating fluid is liquidized. The valve opening is thus reduced quickly to prevent liquidized refrigerant R502 from flowing forward into the compressor 20, as described above in detail referring to the conventional example.

The unequal clearance also serves to delay heat transmission between the thermal ballast 50 and the bulb cylinder 36. The speed at which the liquidized operating fluid trapped in the pores in the lower end of the thermal ballast 50 is gasified is reduced at the time of such temperature rise, as described above. The valve opening is thus increased slowly, so that liquidized refrigerant R502 can be prevented from flowing too quickly forward compressor 20 and the hunting phenomenon can also was be prevented, as also described above in detail referring to the conventional example.

Center through hole 52 of the thermal ballast 50 makes it easy for the operating fluid and the pre-pressure gas to be injected into the bulb cylinder 36 through the pipe 34 in the assembly process of the thermo bulb 16 to shorten the assembly time. In addition, this through hole 52 serves to make the volume of the inner space in the bulb cylinder 36 as large as possible for the purpose of making the change of this volume in the bulb cylinder 36 as small as possible, said change of this volume being caused by the deformation of the diaphragm 26.

It should be understood that the above-described embodiment is an example for describing the present invention and that the present invention is not limited to this basic embodiment, but all changes and modifications made without departing from the technical scope of the present invention are covered by the present invention.

As shown in FIG. 7, for example, two or more through-holes 62 may be formed in the thermal ballast 50 to extend in the axial direction thereof, instead of having only one center through hole 52.

As shown in FIG. 8, the thermal ballast 50 may have a rectangular cross-section.

As shown in FIG. 9, the thermal ballast 50 may have a polygonal cross-section. Thus, the center through hole 52 and two or more through-holes 62 extending in the axial direction, as shown in FIG. 7, may be omitted.

As shown in FIG. 10, the outer diameter of the thermal ballast 50 is made approximately the same as the inner diameter of the bulb cylinder 36 and two or more grooves 64 are formed on the outer surface of the thermal ballast 50 in the axial direction thereof.

What is claimed is:

1. A thermo bulb for use with a thermostatic expansion valve, comprising:
    a temperature sensing cylinder having an inner surface and being connected to a power element of a valve unit of the thermostatic expansion valve;
    a thermal ballast arranged in the temperature sensing cylinder and made by a ceramic sinter, which includes silica and alumina as its main components so as to have at least one bore hole extending straight through in an axial direction of the temperature sensing cylinder and opening at both axial ends of the thermal ballast;
    an operating fluid, sealed in the temperature sensing cylinder so as to change from a gas phase to a liquid phase and vice versa, in response to temperature sensed by the temperature sensing cylinder at an outlet of an evaporator of a refrigeration system; and
    means for fixing the thermal ballast into a certain position with substantially unequal axial clearances in the temperature sensing cylinder so as not to prevent the operating fluid in the gas phase from making surface contact with the inner surface of the temperature sensing cylinder;
    whereby the thermal ballast is able to trap and hold the operating fluid in the liquid phase at surfaces and pores of the thermal ballast.

2. The thermo bulb for use with the thermostatic expansion valve according to claim 1, wherein a plurality of pores in the thermal ballast occupy about 20% to about 40% of the whole volume of the thermal ballast.

3. The thermo bulb for use with the thermostatic expansion valve according to claim 1, wherein the weight percentage of alumina and silica which are the main components of the ceramic sinter for the thermal ballast is in a range of 1: about 0.17 to 1: about 0.2.

4. The thermo bulb for use with the thermostatic expansion valve according to claim 1, wherein the thermal ballast is shaped like a hollow cylinder and the temperature sensing cylinder has an axially extending gas injection through hole at a position that substantially corresponds to a through hole of the hollow cylinder-shaped thermal ballast.

5. The thermo bulb for use with the thermostatic expansion valve according to claim 1, wherein the thermal ballast has at least two through holes extending in an axial direction thereof and said through holes function as the bore hole extending straight through the thermal ballast.

6. The thermo bulb for use with the thermostatic expansion valve according to claim 1, wherein the thermal ballast has a polygonal cross-section that has a plurality of grooves extending on an outer surface of the thermal ballast in an axial direction so as to function as the bore hole extending straight through the thermal ballast.

7. The thermo bulb for use with the thermostatic expansion valve according to claim 1, wherein the thermal ballast has at least two grooves formed on an outer surface so as to extend in an axial direction thereof and said grooves function as the bore hole extending straight through the thermal ballast.

8. The thermo bulb for use with the thermostatic expansion valve according to claim 1, wherein a gas, which is not condensed in a range of temperature sensed by the cylinder at the outlet of the evaporator of the refrigeration system, is sealed in said temperature sensing cylinder to produce a pre-pressure.

9. The thermo bulb for use with the thermostatic expansion valve according to claim 1, wherein the fixing means include a pair of net-like members that sandwich the thermal ballast at both axial ends in order to fix the thermal ballast into said certain position with a large space at an upper end in the temperature sensing cylinder.

10. A thermo bulb for use with a thermostatic expansion valve, comprising:
    a temperature sensing cylinder having an inner surface and being connected to a power element of a valve unit of the thermostatic expansion valve;

a thermal ballast arranged in the temperature sensing cylinder and made by a ceramic sinter, which includes silica and alumina as its main components, so as to have at least one bore hole extending straight through in an axial direction of the temperature sensing cylinder and opening at both axial ends of the thermal ballast;

an operating fluid, sealed in the temperature sensing cylinder so as to change from a gas phase to a liquid phase and vice versa, in response to temperature sensed by the temperature sensing cylinder at an outlet of an evaporator of a refrigeration system; and means for fixing the thermal ballast into a certain position in the temperature sensing cylinder so as not to prevent the operating fluid in the gas phase from making surface contact with the inner surface of the temperature sensing cylinder;

whereby the thermal ballast is able to trap and hold the operating fluid in the liquid phase inside the temperature sensing cylinder.

* * * * *